(12) United States Patent
Work

(10) Patent No.: US 9,377,922 B2
(45) Date of Patent: Jun. 28, 2016

(54) AIDING PEOPLE WITH IMPAIRMENTS

(71) Applicant: Verizon Patent and Licensing Inc., Basking Ridge, NJ (US)

(72) Inventor: Sylvia A. Work, The Colony, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 279 days.

(21) Appl. No.: 13/727,030

(22) Filed: Dec. 26, 2012

(65) Prior Publication Data

US 2014/0181673 A1 Jun. 26, 2014

(51) Int. Cl.
  *G06F 3/048* (2013.01)
  *G06F 3/0484* (2013.01)
  *G09B 21/00* (2006.01)
  *G06F 9/44* (2006.01)

(52) U.S. Cl.
  CPC .............. *G06F 3/048* (2013.01); *G06F 3/0484* (2013.01); *G09B 21/00* (2013.01); *G09B 21/006* (2013.01); *G09B 21/008* (2013.01); *G06F 9/4443* (2013.01)

(58) Field of Classification Search
  None
  See application file for complete search history.

(56) References Cited

U.S. PATENT DOCUMENTS

| | | | |
|---|---|---|---|
| 8,259,222 B2 * | 9/2012 | Rodriguez | H04N 1/195 348/240.99 |
| 8,264,598 B2 * | 9/2012 | Rodriguez et al. | 348/373 |
| 8,494,507 B1 * | 7/2013 | Tedesco et al. | 455/418 |
| 8,543,415 B2 * | 9/2013 | Venon et al. | 705/2 |
| 8,606,316 B2 * | 12/2013 | Evanitsky | 455/556.1 |
| 8,804,031 B2 * | 8/2014 | Rodriguez et al. | 348/373 |
| 2004/0246272 A1* | 12/2004 | Ramian | G06F 3/011 345/660 |
| 2004/0259591 A1* | 12/2004 | Grams et al. | 455/556.1 |
| 2005/0134800 A1* | 6/2005 | Kim | 351/242 |
| 2005/0210417 A1* | 9/2005 | Marvit et al. | 715/863 |
| 2006/0197753 A1* | 9/2006 | Hotelling | 345/173 |
| 2008/0077858 A1* | 3/2008 | Asakawa et al. | 715/255 |
| 2009/0113306 A1* | 4/2009 | Fujishita et al. | 715/729 |
| 2010/0309148 A1* | 12/2010 | Fleizach et al. | 345/173 |
| 2011/0012921 A1* | 1/2011 | Cholewin | G06F 1/1626 345/619 |
| 2011/0208524 A1* | 8/2011 | Haughay | 704/246 |
| 2011/0224967 A1* | 9/2011 | Van Schaik | 704/2 |
| 2012/0001932 A1* | 1/2012 | Burnett et al. | 345/589 |
| 2013/0227418 A1* | 8/2013 | Sa et al. | 715/728 |

* cited by examiner

*Primary Examiner* — Yongjia Pan
*Assistant Examiner* — Mahelet Shiberou

(57) ABSTRACT

A device may receive information identifying a type of impairment, and provide, based on the type of impairment, a user interface. The user interface may allow a user to specify a command and an action that is to be performed, by an application, based on detecting the command. The action may relate to the type of impairment. The device may further receive configuration information via the user interface, where the configuration information identifies the command and the action. The device may configure the application based on the configuration information, detect, using the application, the command, and perform, using the application, the action based on detecting the command.

20 Claims, 7 Drawing Sheets

AIDING PEOPLE WITH IMPAIRMENTS

BACKGROUND

An individual may have issues with their eyesight (as a result of an injury, old age, disease, etc.) that may result in visual impairment. The visual impairment may range from a partial loss of sight to a complete loss of sight for an individual. This and other types of impairments, such as a hearing impairment, may make performing different types of activities difficult.

DETAILED DESCRIPTION OF PREFERRED EMBODIMENTS

The following detailed description refers to the accompanying drawings. The same reference numbers in different drawings may identify the same or similar elements.

Systems and/or methods described herein may assist a user of a user device with performing different types of activities that the user may not be able perform or may have difficulty performing due to an impairment. For example, the user device may enhance the user's vision by magnifying different objects (e.g., magnifying a playing card or an object that is displayed on the screen of the user device) so that when the user views the object on the user device screen the object is visible to the user. Additionally, the user device may provide assistance by presenting audible messages to the user so that the user can be provided information regarding an object. For example, the user device may audibly identify the playing card or the object being displayed on the screen of the user device to the user. Additionally, the user device may provide assistance to the user during emergencies by contacting emergency services (e.g., 911) and/or other individuals (e.g., a family doctor, family member, etc.).

While the following description focuses mainly on aiding people with visual impairment, systems and methods, as described herein, are equally applicable to other types of impairments, such as hearing impairments.

Figure 1:
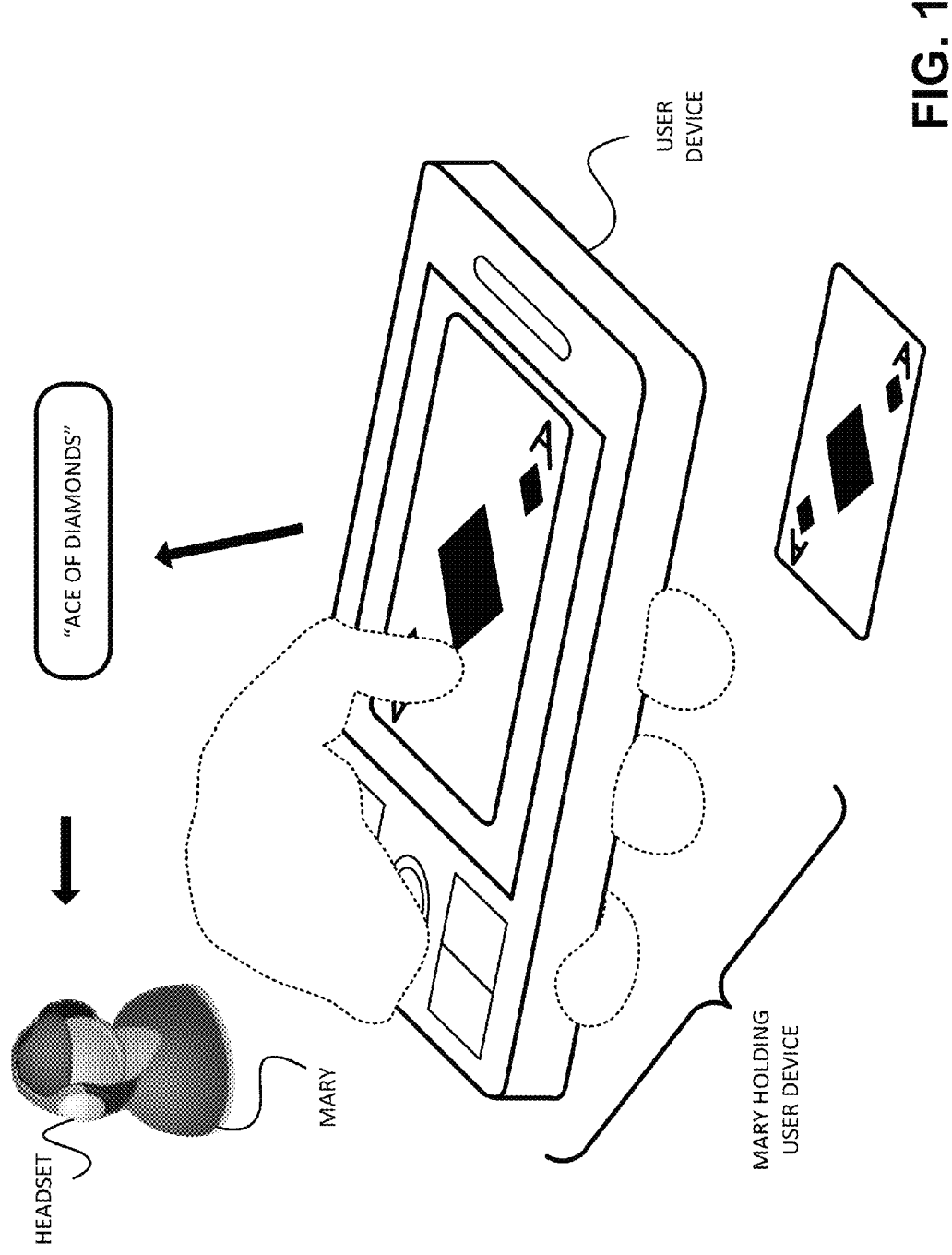
FIG. 1 is a diagram of an overview of an implementation described herein.

FIG. 1 is a diagram of an overview of an implementation described herein. FIG. 1 shows a user device, a user, and a headset. Assume that a user, Mary, participates in a bridge game with her friends every Wednesday night. Mary has an eye condition that makes viewing the cards difficult. Thus, assume that Mary has downloaded an assistance application onto a user device (displayed as a phone). Moreover, assume that Mary has configured the assistance application to visually and audibly identify her cards.

As shown in FIG. 1, Mary may place her phone over a playing card (shown as the ace of diamonds). The phone, based on instructions from the assistance application, may magnify an image of the playing card and cause the magnified image to be displayed on the screen of Mary's phone. Additionally, Mary's phone may send an audible message ("ace of diamonds") to her headset (e.g., a Bluetooth headset).

As a result, the user device may assist Mary, who has a visual impairment, with performing different types of activities. This may permit Mary to increase her ability to perform activities that she may have difficulty performing without the user device.

Figure 2:
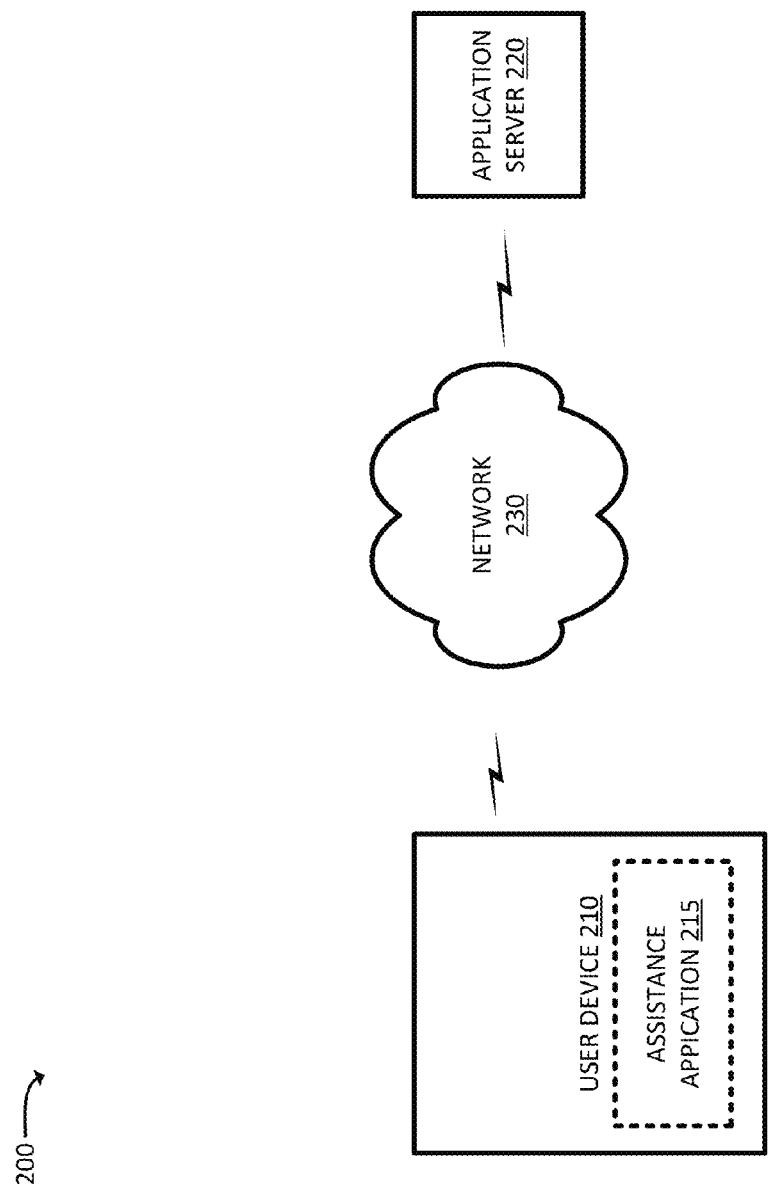
FIG. 2 is a diagram of an example environment in which systems and/or methods described herein may be implemented.

FIG. 2 is a diagram of an example environment 200 in which systems and/or methods described herein may be implemented. Environment 200 may include a user device 210, an application server 220, and a network 230.

User device 210 may include one or more mobile devices that are able to communicate via a network, such as network 230. For example, user device 210 may include a personal digital assistant (PDA) (e.g., that include a radio telephone, a pager, Internet/intranet access, etc.), a tablet computer, a smart phone, a laptop, a gaming device, and/or any other type of mobile device capable of communicating with a network. In some implementations, user device 210 may include assistance application 215.

Assistance application 215 may include an application that configures user device 210 to assist a user, of user device 210, who may have a visual impairment. In some implementations, user device 210 may obtain assistance application 215 from application server 220. In some other implementations, assistance application 215 may come pre-installed on user device 210. Assistance application 215 may assist the user with performing one or more activities (e.g., playing card games, reading magazines, etc.) that the user would not have difficulty performing without assistance application 215.

Application server 220 may include one or more server devices that store different types of applications. Application server 220 may store applications such as assistance applications, video applications, gaming applications, audio applications and/or other types of applications that may be downloaded onto user device 210, Network 230 may include one or more wired and/or wireless networks. For example, network 230 may include a cellular network, a public land mobile network (PLMN), a second generation (2G) network, a third generation (3G) network, a fourth generation (4G) network, a fifth generation (5G) network, and/or another network. Additionally, or alternatively, network 230 may include a local area network (LAN), a wide area network (WAN), a metropolitan network (MAN), a telephone network (e.g., the Public Switched Telephone Network (PSTN)), an ad hoc network, a managed IP network, a virtual private network (VPN), an intranet, the Internet, a fiber optic-based network, and/or combination of these or other types of networks.

The quantity of devices and/or networks, illustrated in FIG. 2 is provided for explanatory purposes only. In practice, there may be additional devices and/or networks; fewer devices and/or networks; different devices and/or networks; and differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
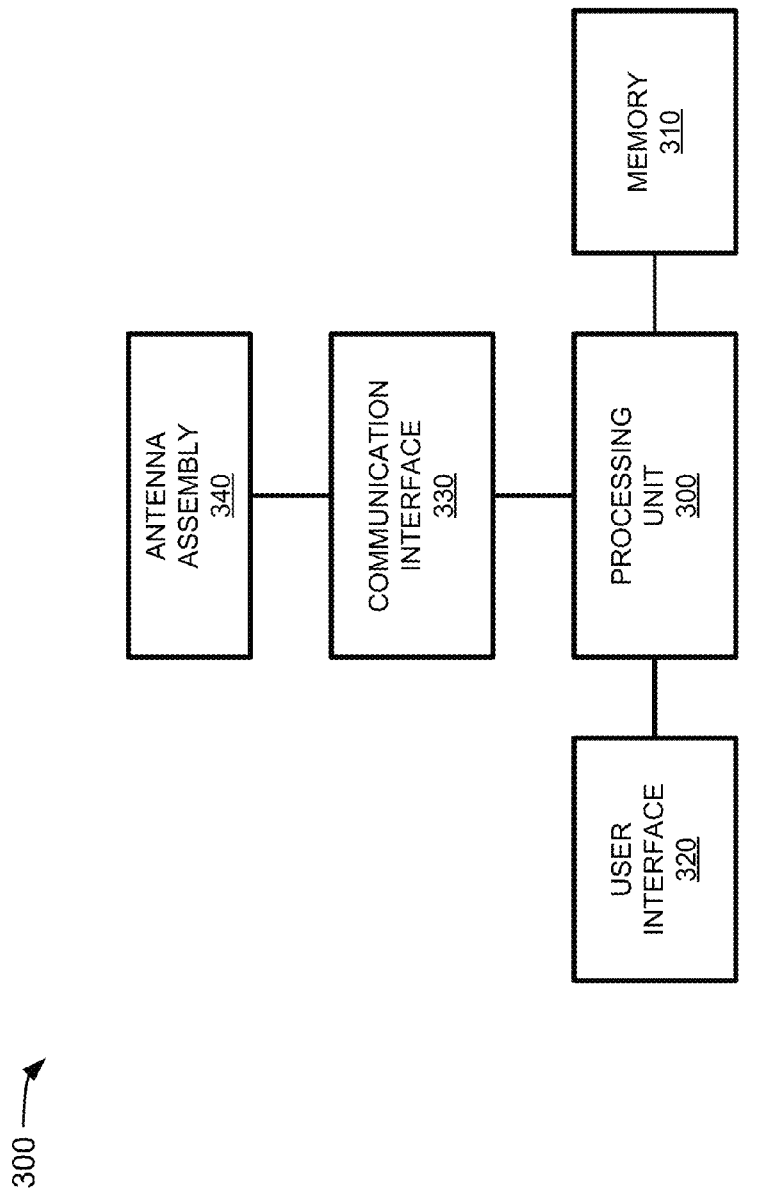
FIG. 3 is a diagram of example components of one or more devices of FIG. 2.

FIG. 3 is a diagram of example components of user device 300. Device 300 may correspond to user device 210 and/or application server 220. In some implementations, user device 210 and/or application server 220 may include one or more devices 300 and/or one or more components of device 300. As illustrated, user device 210 may include a processing unit 300, memory 310, a user interface 320, a communication interface 330, and/or an antenna assembly 340.

Processing unit 300 may include a processor, a microprocessor, an application specific integrated circuit (ASIC), a field programmable gate array (FPGA), or the like. Processing unit 300 may control operation of device 300 and its components. In one implementation, processing unit 300 may control operation of components of device 300 in a manner described herein.

Memory 310 may include a random access memory (RAM), a read-only memory (ROM), and/or another type of memory to store data and instructions that may be used by processing unit 300.

User interface 320 may include mechanisms for inputting information to device 300 and/or for outputting information from device 300. Examples of input and output mechanisms might include buttons (e.g., control buttons, keys of keypad, a joystick, etc.) or a touch screen interface to permit data and control commands to be input into device 300; a speaker to receive electrical signals and output audio signals; a microphone to receive audio signals and output electrical signals; a display to output visual information (e.g., text input into device 300); a vibrator to cause device 300 to vibrate; and/or a camera to receive video and/or images.

Communication interface 330 may include, for example, a transmitter that may convert baseband signals from processing unit 300 to radio frequency (RF) signals and/or a receiver that may convert RF signals to baseband signals. Alternatively, communication interface 330 may include a transceiver to perform functions of both a transmitter and a receiver. Communication interface 330 may connect to antenna assembly 340 for transmission and/or reception of the RF signals.

Antenna assembly 340 may include one or more antennas to transmit and/or receive RF signals over the air. Antenna assembly 340 may, for example, receive RF signals from communication interface 330 and transmit them over the air, and receive RF signals over the air and provide them to communication interface 330. In one implementation, for example, communication interface 330 may communicate with a network and/or devices connected to a network (e.g., network 230).

As will be described in detail below, device 300 may perform certain operations. Device 300 may perform these operations in response to processor 320 executing software instructions (e.g., computer program(s)) contained in a computer-readable medium, such as memory 330, a secondary storage device (e.g., hard disk, CD-ROM, etc.), or other forms of RAM or ROM. A computer-readable medium may be defined as a non-transitory memory device. A memory device may include memory space within a single physical storage device or memory space spread across multiple physical storage devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

The quantity of components, illustrated in FIG. 3 is provided for explanatory purposes only. In practice, there may be additional components; fewer components; different components; and differently arranged components than illustrated in FIG. 3.

Figure 4:
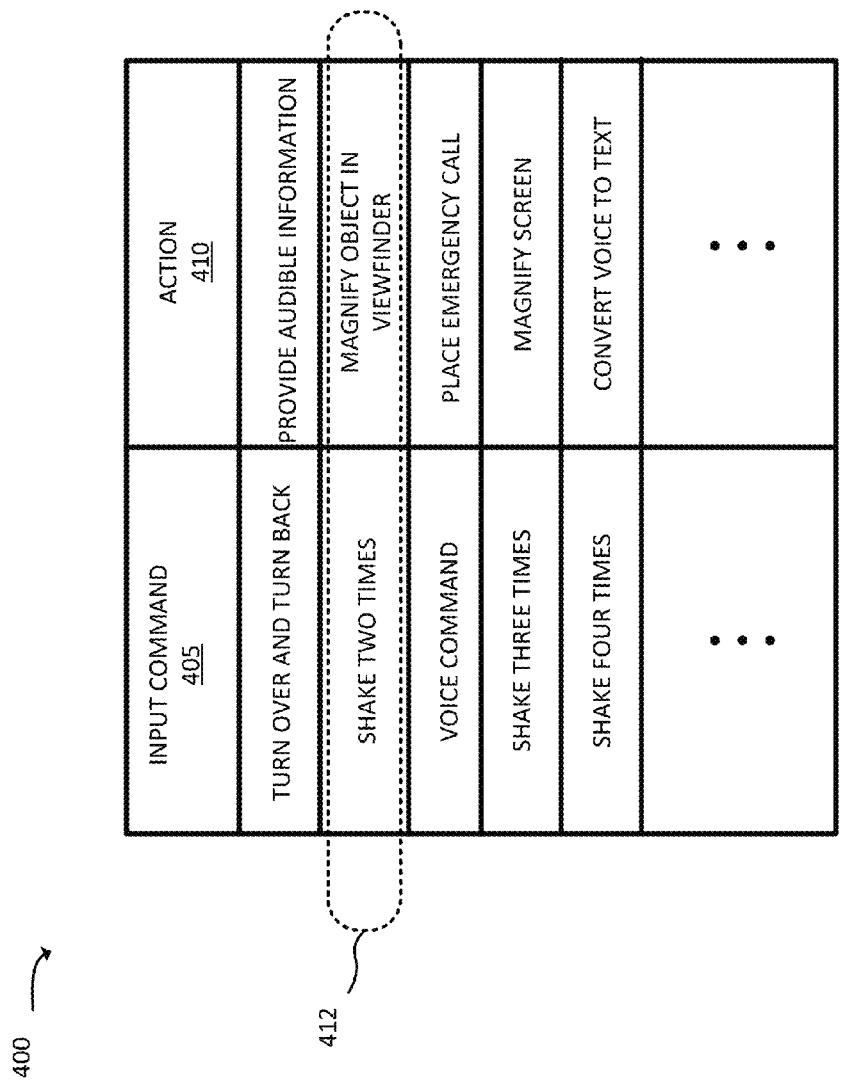
FIG. 4 is a diagram of an example data structure.

FIG. 4 is an example data structure 400 that stores relationships between an input command and an action to be taken by user device 210 based on the input command. In some implementations, user device 210 may store some or all of data structure 400. In some implementations, application server 220 may store some or all of data structure 400. In some implementations, data structure 400 may be stored in memory, associated with another device or a group of devices, separate from, or in combination, with memory associated with user device 210 and/or application server 220.

Data structure 400 may include a collection of fields, such as input command field 405 and action field 410.

Input command field 405 may store information regarding a command that may be initiated by a user of user device 210. The command may include a physical command or an audible command. For example, a physical command may include moving user device 210 in a particular way (e.g., shaking the user device); selecting a particular button or key on user device 210 one or more times; touching the screen of user device 210 one or more time; and/or another type of physical command. An audible command may include speaking a particular word or words (e.g., "help," "magnify this," etc.); detecting a particular sound or sounds (e.g., an alarm); and/or any other type of audible command.

Action field 410 may store information regarding an action taken by assistance application 215, executing on user device 210, based on the information in input command field 405. For example, based on an input command (as described above), user device 210 may magnify an object in the viewfinder of user device 210, magnify the screen of user device 210, provide audible information regarding an object, contact another user device 210 (e.g., via a telephone call, a text message, etc.), reduce the image size of an object, convert audible information to text, and/or another type of action. As an example, as shown in ellipse 412, the user shaking user device 210 two times may cause user device 210 to magnify (e.g., using a camera) an object and displaying the magnified image on the display screen of user device 210.

While FIG. 4 shows example fields 405-410, in other implementations, data structure 400 may include different fields, additional fields, and/or differently arranged fields than depicted in FIG. 4.

Figure 5:
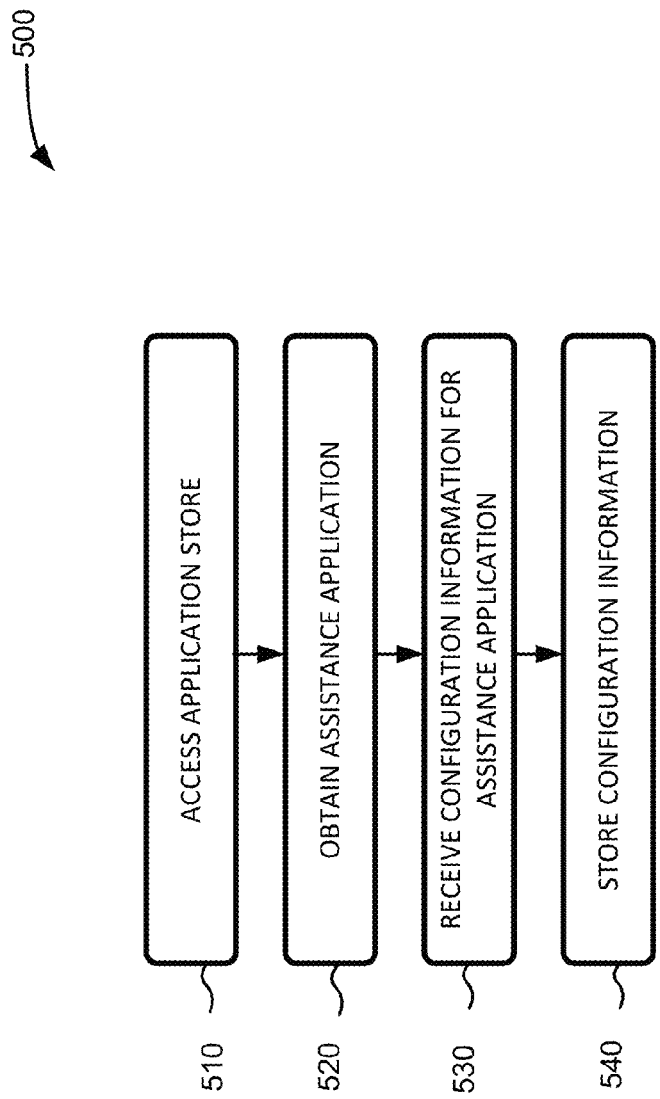
FIG. 5 is a flow chart of an example process for configuration a user device.

FIG. 5 is a flow chart of an example process 500 for configuring a user device. In some implementations, process 500 may be performed by user device 210. In some implementations, one or more blocks of process 500 may be performed by one or more other devices, such as application server 220, separate from or in combination with user device 210.

Process 500 may include accessing an application store (block 510). For example, a user (or another individual assisting the user) may, using user device 210, access (via network 230) an application store stored by application server 220. Upon accessing the application store, a web page may be displayed to the user, on user device 210, with a list of different applications that can be downloaded onto user device 210. One of the applications available for downloading from the application store may be assistance application 215.

In some implementations, assistance application 215 may be an application used to assist the user of user device 210 with different types of activities (e.g., reading, playing card games, viewing objects on a screen of user device 210, communicating with people, etc.). In some implementations, assistance application 215 may be an application that may be used to assist the user with a specific type of activity (e.g., playing games).

Process 500 may include obtaining the assistance application (block 520). For example, the user (or the other individual assisting the user) may select (e.g., selecting an icon representing assistance application 215) assistance application 215 from the list of applications displayed to the user. Upon selecting assistance application 215, user device 210 may download assistance application 215 from application server 220.

Process 500 may include receiving configuration information for the assistance application (block 530). For example, the user (or the other individual assisting the user) may provide configuration information, to user device 210, to configure assistance application 215. The configuration information may include information identifying a type of impairment (e.g., visual impairment, hearing impairment, etc.), information associating a command with an action that assistance application 215 is to perform to aid the user, information linking assistance application 215 to other applications, and/or other information that can aid in configuring assistance application to perform an action to aid the user.

The user may configure assistance application 215 so that when user device 210 is given a particular command, the command causes user device 210 to perform a particular action. As indicated above in connection with FIG. 4, the particular command may include a physical command and/or an audible command. The particular commands may include, for example, moving user device 210 in a particular manner (e.g., shaking user device 210), providing a voice command (e.g., "magnify"), and/or another type of command. In some implementations, user device 210 may provide a user interface, to the user, that allows the user to configure assistance application 215. In some implementations, user device 210 may provide the user interface in response to a command from the user (e.g., based on the user selecting a menu item or based on specifying a type of impairment). Through the user interface, the user may identify a command and associate an action with the command. An example user interface that may be provided for configuring assistance application 215 to aid a visually-impaired user is provided below with respect to FIG. 6.

The user may configure assistance application 215 in other ways. For example, in some implementations, assistance application 215 may serve as a platform for different types of applications. As an example, application designers may develop applications that specifically work in conjunction with assistance application 215. These applications may include any type of application that may be of interest to a user with an impairment, such as video games, communication applications (e.g., for visual, audible, or textual communications), etc. The user may configure assistance application 215 by linking additional applications to assistance application 215. As one example, assume that the user is a teenager with a visual impairment and that the teenager is interested in playing a popular first person shooter video game. Assume further that the video game producer created a version of the popular video game that was specifically designed to work in conjunction with assistance application 215. For example, through assistance application 215, certain portions or items of the video game may automatically be enlarged to facilitate a user seeing those portions or items and the enlargement of the particular portions or items may be turned on, by the user, through a user-specified command. Thus, the teenager may link the popular video game to assistance application 215 to improve the teenager's ability to play the game.

In some implementations, assistance application 215 may be configured to work in conjunction with other applications that have not been specifically designed to work with assistance application 215. For example, in some implementations, the user may link an application to assistance application 215 and assistance application 215 may perform an action, in connection with the application, based on detection of one of the user-specified commands. As one example, assume that the user has linked a browser, of user device 210, to assistance application 215. Upon detecting a command to magnify the screen of user device 210 (e.g., based on the user shaking user device 210 three times), application assistance 215 may magnify the screen of user device 210 to allow the user to improve the user's ability to view information being provided by the browser.

Process 500 may include storing the configuration information (block 540). For example, user device 210 may store the configuration information in a data structure, such as data structure 400 described above with regard to FIG. 4.

While a series of blocks has been described with regard to FIG. 5, the blocks and/or the order of the blocks may be modified in other implementations. Further, non-dependent blocks may be performed in parallel.

Figure 6:
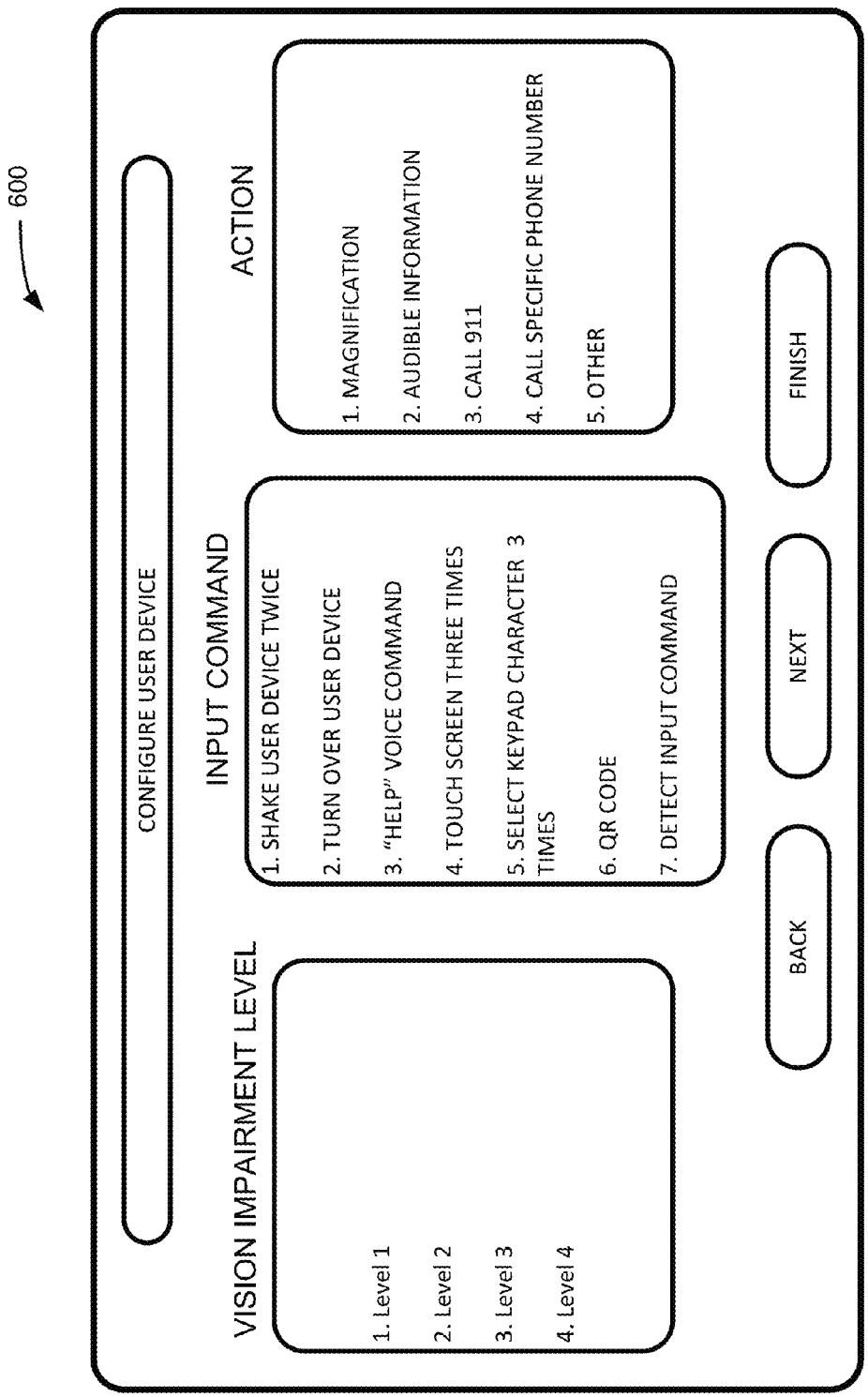
FIG. 6 is a diagram of an example user interface for configuring a user device.

FIG. 6 is an example user interface 600 of assistance application 215 that may be used by the user (or the other individual assisting the user) to configure user device 210 to receive an input command and perform an action based on the input command. While user interface 600 relates to configuring user device 210 for a person who is visually impaired, assistance application 215 may provide other types of user interfaces for people who have other types of impairments.

The configuration, of user device 210, may include providing information regarding the user's vision impairment level. As shown in FIG. 6, the user interface may have a menu for the user to select the user's vision impairment level. Each option may be associated with the user's vision impairment level. For example, if the user selects "level 1," the user cannot read characters that are more than one foot away from the user's face. Alternatively, if the user selects "level 2," the user may not be able read characters that are more than six inches away from the user's face. By the user selecting their vision impairment level, assistance application 215 may adjust a level of magnification object based on the user's selection.

As shown in FIG. 6, the user interface may have a menu of options available for the user to select an input command. By selecting an input command, the user specifies assistance application 215 to use that selected input command to instruct user device 210 to perform an action.

For example, as shown in FIG. 6, one option in the menu for an input command is "touch the screen three times." Based on this selection, assistance application 215 may allow the user to specify that touching the screen three times within a period of time (e.g., 3 seconds, 5 seconds, 8 seconds, etc.) as an input command for assistance application 215. The user may be able to use user interface 600 to further configure this option by choosing the number of times needed for the user to touch the screen and the period of time within which to touch the screen.

In some implementations, instead of the user selecting an option in the menu, the user may perform the movement itself. For example, user device 210 may instruct the user to provide the command and user device 210 may detect the command. As an example, the user may touch the screen three times and this may result in assistance application 215 specifying the user touching the screen three times as the input command. Assistance application 215 may display a message, via user interface 600, to the user that the movement was recognized and accepted as an input command.

In some implementations, the user may select the option in the input command menu associated with selecting a particular keypad character (e.g., a letter, a number, etc.) a particular number of times (e.g., three times, as shown in FIG. 6, or any other number of times). Based on this selection, assistance application 215 may allow the user to specify selecting a keypad character a particular number of times as an input command for assistance application 215. The user may also, using user interface 600, configure the number of times the particular keypad character is pressed and also the associated period of time within which the keypad character is selected.

In some implementations, the user may select the option in the input command menu associated with Quick Response (QR) codes or other types of codes, such as barcodes. Based on this selection, assistance application 215 (executing on user device 210) may allow the user to specify an action that is to be performed based on scanning a QR code or another type of code.

In some implementations, the user may select the option in the input command menu associated with selecting a particular keypad character (e.g., a letter, a number, etc.). Based on this selection, assistance application 215 may allow the user to specify selecting a keypad character as an input command for assistance application 215. In some implementations, the keypad character may configured so that by touching the keypad the user can determine the keypad character based on touching the keypad character.

After the selection of the input command, the user may select the type of action that is associated with the input command. As shown in FIG. 6, a menu (listed under "action") may permit the user to specify a type of action to be taken by user device 210 in response to an input command selected (by the user) from the input command menu.

For example, the user may select the "audible information" option which may cause user device 210 to generate audible information about an object (for the user) based on assistance application 215 receiving an input command (e.g., shaking user device 210 two times within three seconds).

In another example, the user may select the "magnification" selection from the menu of options, as shown in FIG. 6. Based on this selection, user device 210 may magnify the image an object.

To magnify the object, assistance application 215 may, for example, instruct user device 210 to turn on a camera (that is a part of user device 210) and to adjust the camera parameters so that the camera can magnify an image of the object. The amount of magnification may also be specified by the user's selection of the "vision impairment level."

Assistance application 215 may allow the user to specify different levels of magnification with different activities. For example, the user may select the level of magnification for magnifying the image of a playing card at a first level based on a specified input command (e.g., shaking the user device twice). The user may associate a second level of magnification for magnifying medical instructions listed on the cover of a drug prescription bottle based on a different specified input command.

Assistance application 215 may allow the user to specify another action to be performed (by selecting "other" in the action menu shown in FIG. 6). For example, the user may be able specify that, based on a particular input command, user device 210 is to perform another action, such as identifying the colors, and/or other elements of an image that may be displayed on user device 210.

The user may select the "next" option (as shown in FIG. 6) to allow the user to specify another input command and associate the input command with another action. Alternatively, the user may select the "back" option (as shown in FIG. 6) to allow the user to change a previous input command configuration. Alternatively, the user may select the "finish" option (as shown in FIG. 6) to end the configuration process.

Figure 7:
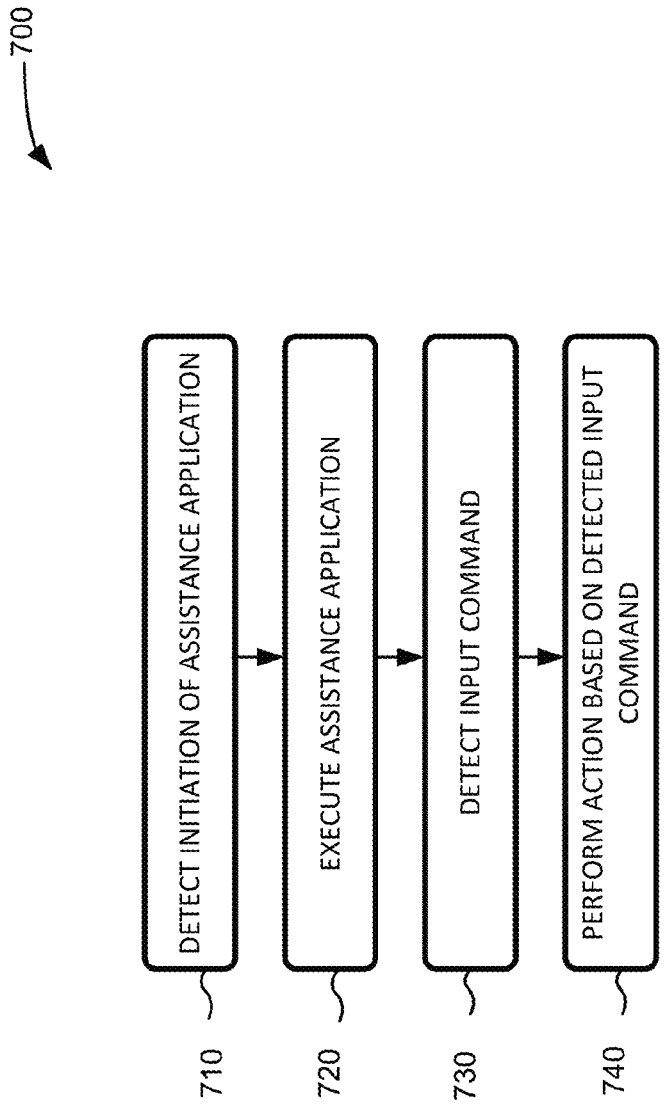
FIG. 7 is a flow chart of an example process for using a user device.

FIG. 7 is a flow chart of an example process 700 for assisting a visually impaired person. In some implementations, process 700 may be performed by user device 210. In some implementations, one or more blocks of process 700 may be performed by one or more other devices, such as application server 220, separate from or in combination with user device 210.

Process 700 may include detecting initiation of an assistance application (block 710). For example, user device 210 may detect the user, of user device 210, initiating assistance application 215. The user may initiate assistance application 215 by touching an icon (associated with assistance application 215) on the display screen of user device 210; giving a verbal command (e.g., "start assistance application") that is detected by user device 210 as a command to initiate assistance application 215; and/or any other type of action performed by the user to initiate assistance application 215.

Process 700 may include executing the assistance application (block 720). For example, user device 210 may execute assistance application 215 based on detecting the initiation of assistance application 215.

Process 700 may include detecting an input command (block 730). For example, user device 210 may, using assistance application 215, detect an input command given by the user of user device 210. For example, the input command could be the user shaking the user device three times (or any other number of times) within a particular period of time (e.g., two seconds, three seconds, four seconds, etc.). Alternatively, for example, the input command could be an audible command given by the user (e.g., "help," "read," "magnify," etc.) that may be received via a microphone on user device 210.

Process 700 may include performing an action based on detecting the input command (block 740). For example, assistance application 215 may cause user device 210 to take a particular action based on the input command detected by assistance application 215. As indicated above, assistance application 215 may associate different input commands with different types of actions based on the user's configuration of assistance application 215 as described with regard to FIG. 5. For example, the user may shake user device 210 twice within two seconds and assistance application 215 may interpret the shaking of user device 210 as an input command for user device 210 to contact the user's primary care doctor. Assistance application 215 may instruct user device 210 to place a telephone call to the user's primary care doctor.

While a series of blocks has been described with regard to FIG. 7, the blocks and/or the order of the blocks may be modified in some implementations. Further, non-dependent blocks may be performed in parallel.

The following description provides examples of process 700 described above with regard to FIG. 7. As a first example, assume that a user, of user device 210 is playing a card game, such as poker. The user may have difficulty viewing the playing cards. The user may touch the screen three times. Touching the screen three times is recognized as an input command by user device 210 to provide audible information to the user. The user may place user device 210 in front of a playing card. A camera in user device 210 may receive an image of the playing card and user device 210 may recognize the playing card. User device 210 may audibly provide information identifying the playing card to a headset worn by the user. The user may listen to the audible information via the headset to determine the identity of the playing card. In this way, the user may participate in poker games, despite having a visual impairment that makes viewing the playing cards difficult.

As a second example, assume that a user, of user device 210, may be casually flipping through a fashion magazine. The user may have difficulty in viewing a particular advertisement in the magazine. In some situations, the advertisement may be associated with scanning a code (e.g., a QR code, a barcode, etc.). The user may use user device 210 to scan the code, which may result in audible information being provided to the user regarding the print advertisement. The user may have a Bluetooth headset that permits the user to listen to the audible information received by user device 210 based on scanning the code. In this way, the user may understand what is being shown in the advertisement despite having a visual impairment that makes viewing the advertisement difficult.

As a third example, assume that a user, of user device 210, may be watching a stage play in a theatre. The user may have difficulty seeing the actors and actresses on the stage. The user may shake user device 210 twice within three seconds. User device 210 may recognize shaking user device 210 twice within three seconds as an input command for magnifying an image of an object that is 100 feet away. The user may place user device in front of the user's line of sight so that user device 210 can provide the user with the magnified imagery of the actors and actresses on the stage and permit the user to watch the play.

As a fourth example, assume that a user, of user device 210, is reading medical instructions listed on a paper cover on the outside of a bottle filled with prescription drugs. The user may have difficulty reading the medical instructions on the paper cover. The user may say the phrase "read medical," while the user is holding user device 210. User device 210 may recognize the phrase "read medical" as an input command for user device 210 to magnify the letter and numbers on the bottle to a particular level of magnification. The user may use user device 210 (by holding the bottle in front of user device's 210 camera) to magnify the words and numbers on the paper cover so that the user can read the words and numbers.

As a fifth example, assume that a user, of user device 210, is at home when the user feels as if they are having a heart attack. The user may shout "help" which is recognized by user device 210 as an input command for user device 210 to contact (e.g., via a telephone call) 911 or another phone number for emergency services. The user may, using user device 210, communicate with another individual (e.g., a 911 dispatcher) so that medical help can arrive.

As a sixth example, assume that a user, of user device 210, has a hearing impairment. Assume further that the user has linked a telephone application, on user device 210, to assistance application 215 and configured assistance application to convert voice to text based on the user shaking user device 210 four times. Assume that the user places a telephone call to a relative and is having a hard time hearing the relative (e.g., as a result of the tone of the relative's voice). The user may shake user device 210 four times, which will cause assistance application 215 to begin converting the relative's voice to text. In this way, user device 210 may improve the user's ability to communicate with the relative.

Systems and/or methods described herein assist a user (of a user device) with performing different types of activities that the user may have difficulty performing due to a user's visual impairment.

The foregoing disclosure provides illustration and description, but is not intended to be exhaustive or to limit the embodiments to the precise form disclosed. Modifications and variations are possible in light of the above disclosure or may be acquired from practice of the embodiments.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A device comprising:
a processor to:
receive information identifying a type of impairment,
the type of impairment including a visual impairment;
provide, based on the type of impairment, a user interface,
the user interface allowing a user to specify a command and an action that is to be performed, by an application, based on detecting the command,
the action relating to the type of impairment, and
the action including magnifying an image captured by a camera;
receive configuration information via the user interface,
the configuration information identifying the command and the action, and
the configuration information identifying a level of visual impairment;
configure the application based on the configuration information;
automatically select a level of magnification for the camera based on the level of visual impairment;
identify two or more movements, associated with the device, within a defined period of time;
detect, using the application, the command based on the two or more movements within the defined period of time; and
perform, using the application, the action based on detecting the command,
the action including activating the camera and adjusting camera parameters that cause the camera to magnify the image to the level of magnification automatically selected based on the level of visual impairment.

2. The device of claim 1, where the action further includes at least one of:
audible identification of an object included in the image,
audible identification of an object in a viewfinder of the camera, or
audible identification of information scanned from a barcode.

3. The device of claim 1,
where the type of impairment includes a hearing impairment, and
where the action further includes conversion of audible information to textual information.

4. The device of claim 1,
where the configuration information further includes:
information linking the application to another application,
where the processor, when configuring the application, is to:
link the application to the other application, and
where the processor is further to:
perform another action in the other application,
the other action including at least one of:
magnification of an object that the other application has caused to be displayed,
audible identification of the object that the other application has caused to be displayed, or
conversion of audible information, provided by the other application, to textual information.

5. The device of claim 1, where the action further includes placement of a telephone call to an emergency contact or number.

6. The device of claim 1, where the image is of an object a particular distance away from the camera.

7. The device of claim 1,
where the user interface allows the user to specify a plurality of commands, including the command, and a plurality of actions, including the action, that are to be performed, by the application, based on detecting at least one of the plurality of commands,
where the action includes a first action that magnifies the image to a first user specified level of magnification, and
where the plurality of actions further include a second action that magnifies the image to a second user specified level of magnification.

8. The device of claim 1, where the two or more movements include shaking the device.

9. The device of claim 1, where the two or more movements include touching a screen associated with the device.

10. A method comprising:
receiving, by a device, information identifying a type of impairment;
the type of impairment including a visual impairment;
providing, by the device and based on the type of impairment, a user interface,
the user interface allowing a user to specify a command and an action that is to be performed, by an application, when the command is detected,
the action relating to the type of impairment, and
the action including magnifying an image captured by a camera;
receiving, by the device, configuration information via the user interface;
the configuration information identifying the command and the action, and
the configuration information identifying a level of visual impairment;

configuring, by the device, the application based on the configuration information;
automatically selecting, by the device, a level of magnification for the camera based on the level of visual impairment;
identifying, by the device, two or more movements, associated with the device, within a defined period of time;
detecting, by the device and using the application, the command based on the two or more movements within the defined period of time; and
performing, by the device and using the application, the action based on detecting the command,
the action including activating the camera and adjusting camera parameters that cause the camera to magnify the image to the level of magnification automatically selected based on the level of visual impairment.

11. The method of claim 10, where the action further includes at least one of:
audible identification of an object included in the image,
audible identification of an object in a viewfinder of the camera, or
audible identification of information scanned from a barcode.

12. The method of claim 10,
where the type of impairment includes a hearing impairment, and
where the action further includes conversion of audible information to textual information.

13. The method of claim 10,
where the configuration information further includes:
information linking the application to another application,
where configuring the application includes:
linking the application to the other application, and
where the method further includes:
performing another action in the other application,
the other action including at least one of:
magnification of an object that the other application has caused to be displayed,
audible identification of the object that the other application has caused to be displayed, or
conversion of audible information, provided by the other application, to textual information.

14. The method of claim 10, where the action further includes placement of a telephone call to an emergency contact or number.

15. The method of claim 10, where the two or more movements include shaking the device.

16. The method of claim 10 where the two or more movements include touching a screen associated with the device.

17. A non-transitory computer-readable medium storing instructions, the instructions comprising:
one or more instructions that, when executed by one or more processors of a user device, cause the one or more processors to:
associate, in memory, a plurality of commands with a plurality of actions,
the plurality of actions including audible identification of an object captured by a camera,
the plurality of actions including magnifying the object captured by the camera;
receive information identifying a level of visual impairment;
automatically select a level of magnification for the camera based on the level of visual impairment;
identify two or more movements, associated with the user device, within a defined period of time;

identify a command, from among the plurality of commands, based on the two or more movements within the defined period of time; and selectively, based on identifying the command, adjust camera parameters that cause the camera to magnify the object to the level of magnification.

18. The non-transitory computer-readable medium of claim 17, where the two or more movements include shaking the user device.

19. The non-transitory computer-readable medium of claim 17, where the object includes a barcode.

20. The non-transitory computer-readable medium of claim 17, where the one or more instructions, when executed by the one or more processors, further cause the one or more processors to:

associate, in the memory, a second command with a second action,
the second command being a user-specified physical movement of the user device, and
the second action including a placement of an emergency telephone call;

detect that the user device has been moved in a first manner;

determine that the first manner corresponds to the user-specified physical movement; and place the emergency telephone call based on determining that the first manner corresponds to the user-specified physical movement.

\* \* \* \* \*